(12) United States Patent
Jawad et al.

(10) Patent No.: US 10,142,589 B2
(45) Date of Patent: *Nov. 27, 2018

(54) INITIATING A VIDEO CONFERENCING SESSION

(71) Applicant: Google LLC, Mountain View, CA (US)

(72) Inventors: Anthony Jawad, Mountain View, CA (US); Michel Ossesia, Menlo Park, CA (US); Tomas Lundqvist, Segeltorp (SE); Kathryn Cushing, San Francisco, CA (US); Jordanna Chord, Kenmore, WA (US); Tobias Jungen, Redmond, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,809

(22) Filed: Jul. 29, 2016

(65) Prior Publication Data

US 2016/0337613 A1 Nov. 17, 2016

Related U.S. Application Data

(63) Continuation of application No. 13/893,583, filed on May 14, 2013, now Pat. No. 9,407,862.

(51) Int. Cl.
| | |
|---|---|
| *H04N 7/15* | (2006.01) |
| *H04N 7/14* | (2006.01) |
| *H04L 12/18* | (2006.01) |
| *H04M 3/56* | (2006.01) |
| *H04L 29/06* | (2006.01) |

(52) U.S. Cl.
CPC ......... *H04N 7/147* (2013.01); *H04L 12/1813* (2013.01); *H04L 12/1822* (2013.01); *H04L 65/1069* (2013.01); *H04L 65/403* (2013.01); *H04M 3/567* (2013.01); *H04N 7/141* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 8,331,542 B2 | 12/2012 | Crausaz et al. | |
| 8,928,727 B1 | 1/2015 | Milligan et al. | |
| 8,958,537 B1 | 2/2015 | Saylor | |
| 2005/0231588 A1* | 10/2005 | Yang | H04L 12/1813 348/14.08 |
| 2006/0153168 A1* | 7/2006 | Saksena | H04L 29/06027 370/352 |
| 2007/0255807 A1 | 11/2007 | Hayashi et al. | |
| 2010/0079573 A1 | 4/2010 | Isaac | |

(Continued)

*Primary Examiner* — Joseph J Nguyen

(57) ABSTRACT

A method, computer program product, and computer system for receiving, at a computing device, a call from a first telephony device using a telephone number associated with a second telephony device and a web-based user account. An indication of the call is received at the computing device where the web-based user account is signed into. An input is received at the computing device to accept the call. A conferencing application session associated with the web-based user account is initiated at the computing device between the first telephony device and the computing device based upon, at least in part, receiving the input to accept the call.

20 Claims, 5 Drawing Sheets

(56) References Cited

U.S. PATENT DOCUMENTS

| | | |
|---|---|---|
| 2010/0182394 A1* | 7/2010 | Zhan .................. H04N 7/15 |
| | | 348/14.01 |
| 2010/0251142 A1 | 9/2010 | Geppert et al. |
| 2011/0047182 A1 | 2/2011 | Shepherd et al. |
| 2011/0096140 A1 | 4/2011 | Samadani et al. |
| 2011/0149809 A1 | 6/2011 | Narayanaswamy |
| 2011/0150194 A1 | 6/2011 | Narayanaswamy |
| 2012/0127257 A1 | 5/2012 | Lu et al. |
| 2012/0226997 A1 | 9/2012 | Pang |
| 2012/0281060 A1 | 11/2012 | Swanson et al. |
| 2013/0051542 A1* | 2/2013 | Yao ................ H04M 3/42042 |
| | | 379/142.09 |
| 2013/0080224 A1 | 3/2013 | O'Brien |
| 2013/0097093 A1 | 4/2013 | Kolber et al. |
| 2013/0117439 A1* | 5/2013 | Oliver ................ H04L 65/1069 |
| | | 709/224 |
| 2013/0332832 A1 | 12/2013 | Lin |
| 2013/0339431 A1 | 12/2013 | Yannakopoulos et al. |

\* cited by examiner

INITIATING A VIDEO CONFERENCING SESSION

CROSS-REFERENCE TO RELATED APPLICATIONS

This application is a continuation of U.S. patent application Ser. No. 13/893,583, filed on May 14, 2013. The entire disclosure of the above application is incorporated herein by reference.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs. One such use of the Internet is to allow people to video conference with each other. As videoconferencing adds a video component to a communication session, such communication sessions may tend to be more enjoyable for the participants. However, it may be necessary for the computing device that is capable of performing the video conference to initiate the communication session.

BRIEF SUMMARY OF DISCLOSURE

In one implementation, a method, performed by one or more computing devices, comprises receiving, at a computing device, a call from a first telephony device using a telephone number associated with a second telephony device and a social network user account. An indication of the call may be received at the computing device where the social network user account may be signed into. An input may be received at the computing device to accept the call. A conferencing application session associated with the social network user account may be initiated at the computing device between the first telephony device and the computing device based upon, at least in part, receiving the input to accept the call, wherein the conferencing application session includes real-time video and audio capabilities between the first telephony device and the computing device.

In another implementation, a computing system includes a processor and a memory configured to perform operations comprising receiving, at a computing device, a call from a first telephony device using a telephone number associated with a second telephony device and a web-based user account. An indication of the call may be received at the computing device where the web-based user account may be signed into. An input may be received at the computing device to accept the call. A conferencing application session associated with the web-based user account may be initiated at the computing device between the first telephony device and the computing device based upon, at least in part, receiving the input to accept the call.

One or more of the following features may be included. The conferencing application session may include at least one of real-time video and audio capabilities between the first telephony device and the computing device. The conferencing application session may be initiated in a browser at the computing device. The web-based user account may include a social network user account. The telephone number may be assigned to the conferencing application session. The telephone number may be assigned to the web-based user account. The conferencing application session may persist without any participants present. The telephone number may be forwarded to the computing device. The telephone number may be received, at least in part, via a public switched telephone network. The conferencing application session may enable mutation of the conferencing application session.

In another implementation, a computer program product resides on a computer readable storage medium that has a plurality of instructions stored on it. When executed by a processor, the instructions cause the processor to perform operations comprising receiving, at a computing device, a call from a first telephony device using a telephone number associated with a second telephony device and a web-based user account. An indication of the call may be received at the computing device where the web-based user account may be signed into. An input may be received at the computing device to accept the call. A conferencing application session associated with the web-based user account may be initiated at the computing device between the first telephony device and the computing device based upon, at least in part, receiving the input to accept the call.

One or more of the following features may be included. The conferencing application session may include at least one of real-time video and audio capabilities between the first telephony device and the computing device. The conferencing application session may be initiated in a browser at the computing device. The web-based user account may include a social network user account. The telephone number may be assigned to the conferencing application session. The telephone number may be assigned to the web-based user account. The conferencing application session may persist without any participants present. The telephone number may be forwarded to the computing device. The telephone number may be received, at least in part, via a public switched telephone network. The conferencing application session may enable mutation of the conferencing application session.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

As will be described in greater detail below, a first user may desire to start a video conferencing session, such as the type offered by social networking sites, with a second user. Video conferencing may enable multiuser video conferences that allow for virtual gatherings of people so that they may chat about specific topics. When receiving a phone call from a second user using, e.g., a phone number provided by, e.g., a telecommunications service, the first user may generally only answer it either from within a chatting application or have the phone call forwarded to a preselected device. The conversation thus may result in a 1:1 interaction that may be restricted to audio and may not be mutated. Additionally, the first user may start a video conferencing session from a client electronic device (e.g., a PC), and then "dial out" to the second user's phone (e.g., data enabled mobile device, smart phone, etc.) from the video conferencing session to achieve the ability to conference with both video and phone participants. However, while the second user may use their phone to be invited to the video conferencing session, there may not be a known technique for the second user to use their phone to initiate the video conferencing session. To help remedy this example deficiency, the present disclosure describes examples of how a user may use their phone to initiate the video conferencing session. It will be appreciated that while a particular video conferencing application is described, other examples of video conferencing applications may be used without departing from the scope of the disclosure. As a non-limiting example, any video conferencing application that provides, e.g., a combination of VOIP and Video Chats (or the like), may be used.

Figure 1:
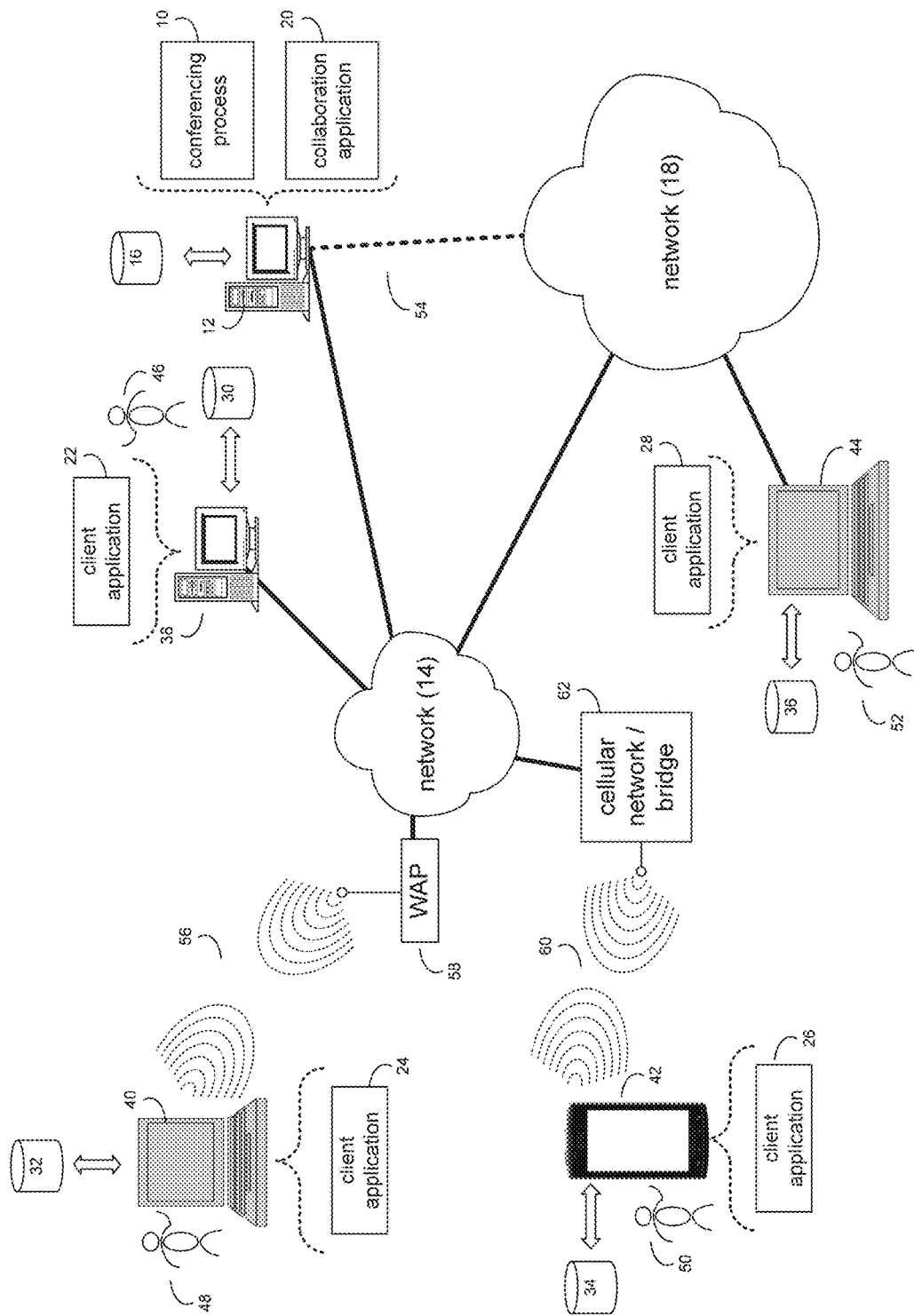
FIG. 1 is an illustrative diagrammatic view of a conferencing process coupled to a distributed computing network according to one or more implementations of the present disclosure.

Referring to FIG. 1, there is shown conferencing process 10 that may reside on and may be executed by a computer (e.g., computer 12), which may be connected to a network (e.g., network 14) (e.g., the internet, a local area network, a public switched telephone network (PSTN), etc.). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hate®Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, conferencing process 10 may receive, at a computing device, a call from a first telephony device using a telephone number associated with a second telephony device and a web-based user account. An indication of the call may be received at the computing device where the web-based user account may be signed into. An input may be received at the computing device to accept the call. A conferencing application session associated with the web-based user account may be initiated at the computing device between the first telephony device and the computing device based upon, at least in part, receiving the input to accept the call.

The instruction sets and subroutines of conferencing process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; an intranet; or a public switched telephone network (PSTN); for example.

Computer 12 may execute a collaboration application (e.g., collaboration application 20), examples of which may include, but are not limited to, e.g., a web conferencing application, a video conferencing application, a voice-over-IP application, a video-over-IP application, video chatting application, or other application that allows for virtual meeting and/or remote collaboration. Conferencing process 10 and/or collaboration application 20 may be accessed via client applications 22, 24, 26, 28. Conferencing process 10 may be a stand alone application, or may be an applet/application/script that may interact with and/or be executed within collaboration application 20 and/or one or more of client applications 22, 24, 26, 28. Collaboration application 20 may be a stand alone application, or may be an applet/application/script that may interact with and/or be executed within conferencing process 10 and/or one or more of client applications 22, 24, 26, 28. One or more of client applications 22, 24, 26, 28 may be a stand alone application, or may be an applet/application/script that may interact with and/or be executed within conferencing process 10 and/or collaboration application 20. Examples of client applications 22, 24, 26, 28 may include, but are not limited to, e.g., a web conferencing application, video conferencing application, voice-over-IP application, a video-over-IP application, video chatting application, or other application that allow for virtual meeting and/or remote collaboration, a standard and/or mobile web browser, an email client application, a chatting application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of conferencing process 10 (and vice versa). Accordingly, conferencing process 10 may be a purely server-side application, a purely client-side application, or a hybrid server-side/client-side application that is cooperatively executed by one or more of client applications 22, 24, 26, 28 and/or conferencing process 10.

One or more of client applications 22, 24, 26, 28 may be configured to effectuate some or all of the functionality of collaboration application 20 (and vice versa). Accordingly, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, conferencing process 10, and collaboration application 20, taken singly or in any combination, may effectuate some or all of the same functionality, any description of effectuating such functionality via one or more of client applications 22, 24, 26, 28, conferencing process 10, collaboration application 20, or combination thereof, and any described interaction(s) between one or more of client applications 22, 24, 26, 28, conferencing process 10, collaboration application 20, or combination thereof to effectuate such functionality, should be taken as an example only and not to limit the scope of the disclosure.

Users 46, 48, 50, 52 may access computer 12 and conferencing process 10 (e.g., using one or more of client electronic devices 38, 40, 42, 44) directly through network 14 or through secondary network 18. Further, computer 12 may be connected to network 14 through secondary network 18, as illustrated with phantom link line 54. Conferencing process 10 may include one or more user interfaces, such as browsers and textual or graphical user interfaces, through which users 46, 48, 50, 52 may access conferencing process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
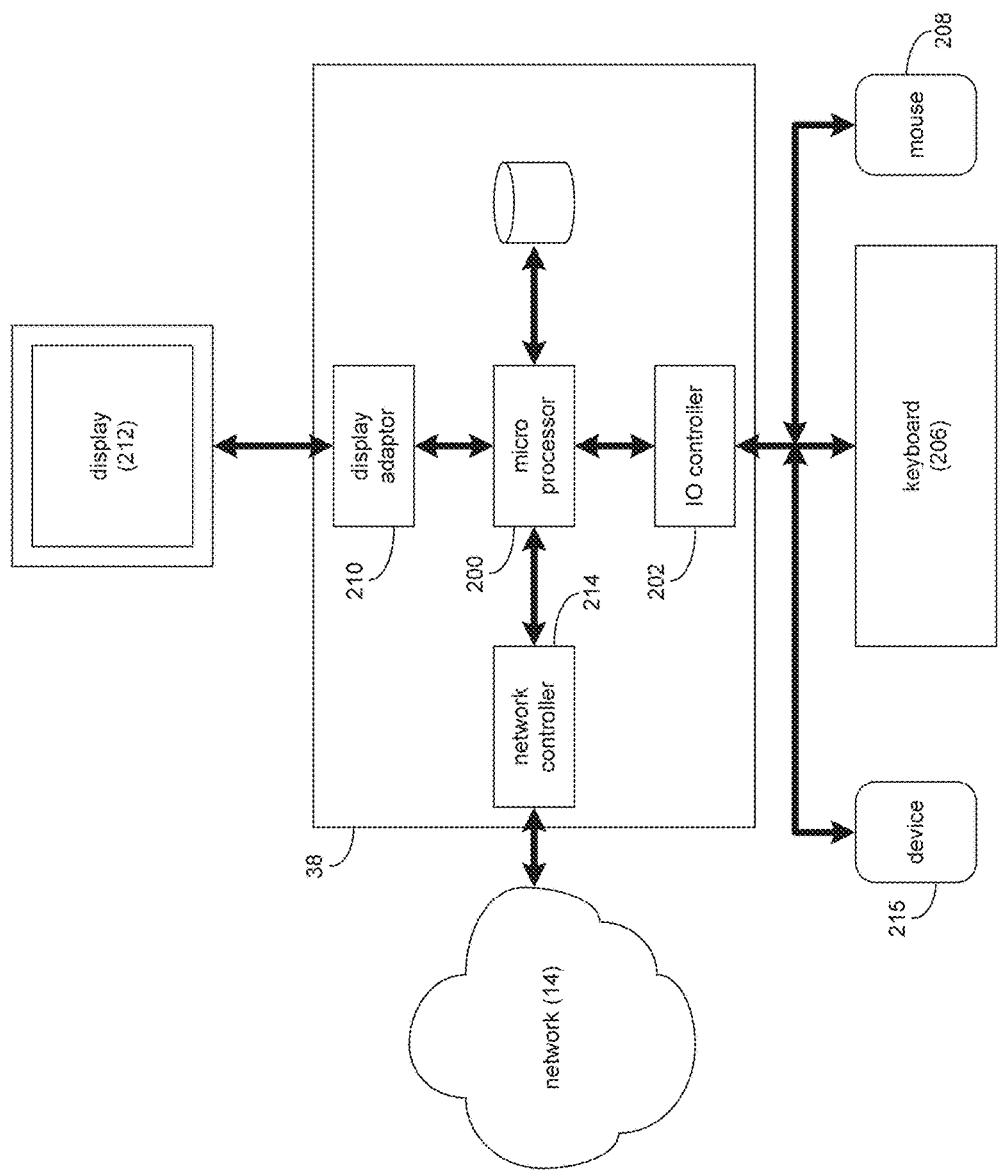
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, conferencing process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Figure 3:
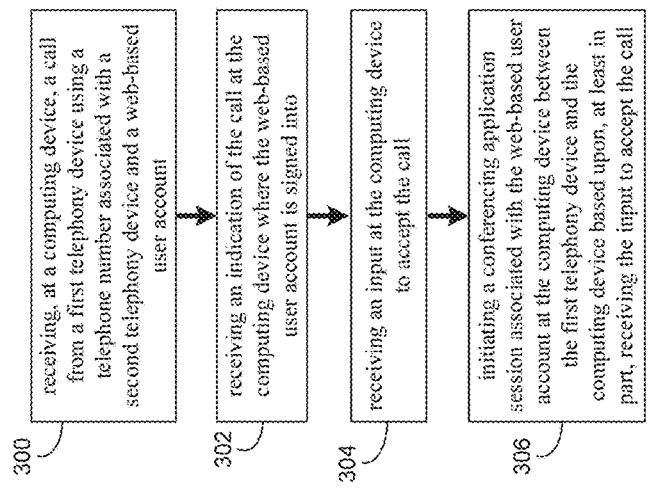
FIG. 3 is an illustrative flowchart of the conferencing process of FIG. 1 according to one or more implementations of the present disclosure.
Figure 4:
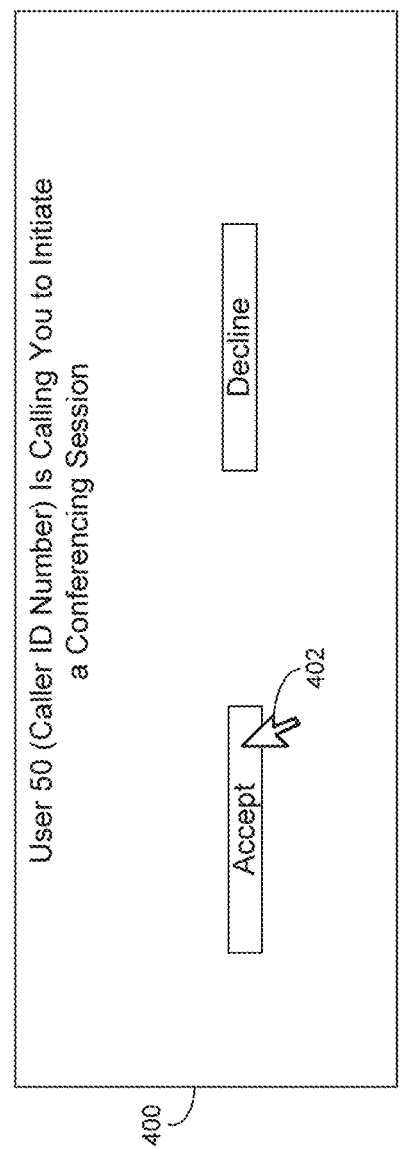
FIG. 4 is an illustrative diagrammatic view of a screen image displayed by the conferencing process of FIG. 1 according to one or more implementations of the present disclosure.

As discussed above and referring also to FIGS. 3-5, conferencing process 10 may receive 300, at a computing device, a call from a first telephony device using a telephone number associated with a second telephony device and a web-based user account. An indication of the call may be received 302 by conferencing process 10 at the computing device where the web-based user account may be signed into. An input may be received 304 by conferencing process 10 at the computing device to accept the call. A conferencing application session associated with the web-based user account may be initiated 306 by conferencing process 10 at the computing device between the first telephony device and the computing device based upon, at least in part, receiving the input to accept the call.

For instance, conferencing process 10 may receive 300, at a computing device (e.g., client electronic device 38), a call from a first telephony device (e.g., client electronic device 42) using a telephone number that may be associated with a second telephony device (not shown) and a web-based user account. For instance, assume for example purposes only that a first user (e.g., user 50) may desire to start a video conferencing session (e.g., via client electronic device 42 and collaboration application 20, client application 26, or combination thereof), with a second user (e.g., user 46) (e.g., via client electronic device 38 and collaboration application 20, client application 22, or combination thereof). The conferencing application session may include at least one of real-time video and audio capabilities between the first telephony device (e.g., client electronic device 42) and the computing device (e.g., client electronic device 38). Other features, such as, e.g., application interaction, file sharing, muting each other, etc. may also be included.

In some implementations, user 50 may via client electronic device 42 "dial" an identification (e.g., the above-noted phone number) associated with the second telephony device of user 46. In some implementations, the telephone number may be received 300, at least in part, via a public switched telephone network (PSTN). However, it will be appreciated that the use of a PSTN should be taken as an example only and not to limit the scope of the disclosure. In some implementations, the telephone number may be assigned to the web-based user account by conferencing process 10. For instance, as will be discussed in greater detail below, user 46 may be registered as a user of a system, company, etc., allowing access to services such as but not limited to, e.g., email, instant messaging, telecommunications, social networking sites, etc. or the like offered from other systems, companies, etc. In the example, the telephone number may be assigned to the main web-based user account offering the above-noted service(s) for user 46, and therefore may be assigned to any of the above-noted services, e.g., a telecommunications service (e.g., capable of call forwarding and communications with other client electronic devices) or the like. The telecommunications may enable, e.g., PC-PC voice and video calling, and PC-phone calling. Additionally/alternatively, the telephone number may be different than the one assigned to the second telephony device by the mobile service provider. For instance, assume for example purposes only that the telephone number provided by the mobile service provider of the second telephony device is 555-456-7890. In the example, the telephone number of the second telephony device may be, e.g., 555-765-4321.

Continuing with the above-example, the telephone number may be forwarded to the computing device. For instance, assume that user 46 has a telephone number that is set up to forward communications (e.g., phone calls, texts, etc.) to another client electronic device (e.g., client electronic device 38). As such, when user 50 (e.g., via client electronic device 42) makes a call using the 555-765-4321 number associated with the second telephony device of user 46, the call may be received 300 by conferencing process 10 at, e.g., the second telephony device, and forwarded to client electronic device 38. Additionally/alternatively, the call may be received 300 by conferencing process 10 at client electronic device 38 without first being directed towards the second telephony device.

As noted above, the telephone number that may be associated with a web-based user account. In some implementations, the web-based user account may include a social network user account. For example, user 46 may be registered as a user of a company and/or system allowing access to any of the above-noted example services or the like. It will be appreciated that other social network user accounts may be used without departing from the scope of the disclosure.

In some implementations, an indication of the call may be received 302 by conferencing process 10 at the computing device where the web-based user account may be signed into. For instance, and continuing with the above example, further assume that user 46 via client electronic device 38 may be signed into at least one of the above-noted services, which may include "chatting" abilities (e.g., text, audio/video). In response to receiving 300 the call (e.g., using the 555-765-4321 number), client electronic device 38 may receive 302 an indication that the call has been received 300. In some implementations, the indication may include, e.g., pop-up window 400 generated at a user interface of conferencing process 10 via display 212. The indication may include an audio indication, such as a "ringing" commonly used with telephony devices. In some implementations, some or all client electronic devices where user 46 may be signed into the web-based user account may receive the indication. The second telephony device may also include an indication that the call is (being) received 300.

In some implementations, an input may be received 304 by conferencing process 10 at the computing device to accept the call. For example, pop-up window 400 may include text indicating that one or more users (e.g., user 50) may be requesting to initiate a video conferencing session with user 46, as well as the caller ID (e.g., phone number) of user 50. User 46 may use, e.g., cursor 402, to either accept the request or decline the request. It will be appreciated that the design of the user interface (e.g., pop-up window 400) is for example purposes only and should not be taken to limit the scope of this disclosure.

In some implementations, a conferencing application session associated with the web-based user account may be initiated 306 by conferencing process 10 at the computing device between the first telephony device and the computing device based upon, at least in part, receiving 304 the input to accept the call. For instance, assume for example purposes only that user 46 uses cursor 402 to accept the call (e.g., request from user 50 to initiate the conferencing application session). In response, conferencing process 10 may initiate 306 (e.g., launch) the conferencing application session between client electronic device 42 and client electronic device 38 and answer the call.

Figure 5:
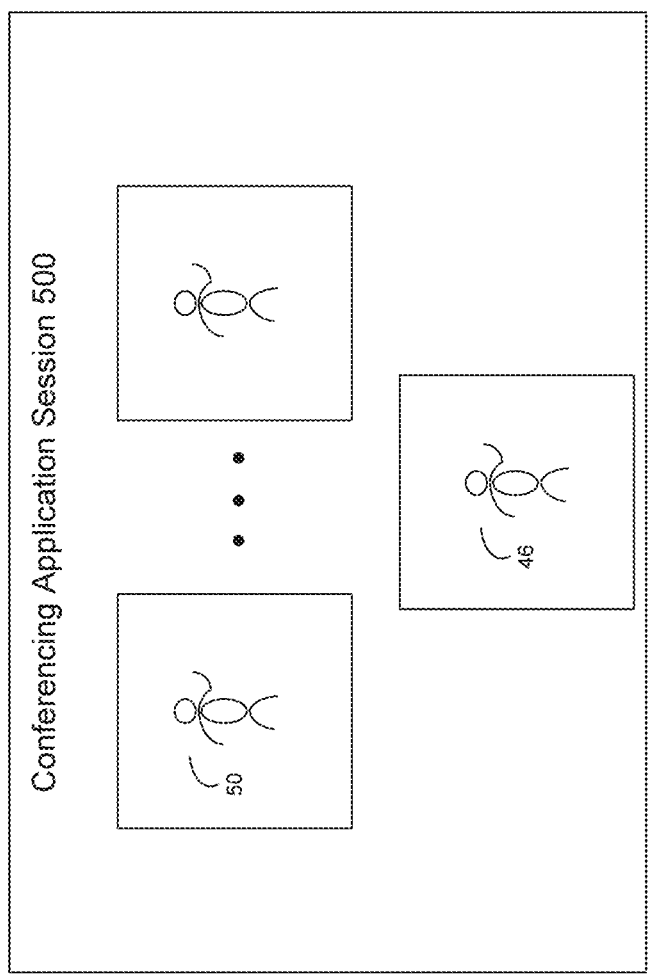
FIG. 5 is an illustrative diagrammatic view of a screen image displayed by the conferencing process of FIG. 1 according to one or more implementations of the present disclosure.

In some implementations, the conferencing application session may be initiated 306 in a browser at the computing device. For instance, assume for example purposes only that the above-noted services where user 46 may be signed into are accessed via a web browser (e.g., via client application 22) on client electronic device 38. The conferencing application session may be initiated 306 within one or more of the above-noted services (in the browser) where user 46 may be signed into. Additionally/alternatively, the conferencing application session may initiate 306 within a new window in the browser. As such, the conferencing application session may be "tied into" the above-noted services, which users typically remain signed into throughout the day. In some implementations, since conferencing application session 500 may be initiated 306 in a browser, initiation 306 of conferencing application session 500 may not require installation of client software (e.g., such as the client software that may be required from other collaboration applications). In some implementations, user 46 may use cursor 402 to either accept the request or decline the request within the browser. An example conferencing application session (e.g., conferencing application session 500) generated and initiated 306 by conferencing process 10 is shown at FIG. 5.

In some implementations, the conferencing application session may be initiated 306 automatically without requiring receipt 304 of the above-noted input. As such, the description of receiving 304 an input to accept the call to initiate conferencing application session 500 should be taken as an example only.

In some implementations, the conferencing application session may enable mutation of the conferencing application session. For example, once conferencing application session 500 is launched, user 46 and user 50 may talk, and user 46 may mutate conferencing application session 500 by, e.g., inviting other participants to join in via phone or video.

As noted above, the telephone number may be assigned to the web-based user account by conferencing process 10. Additionally/alternatively, the telephone number may be assigned to conferencing application session 500 by conferencing process 10 and conferencing application session 500 may persist without any participants present. For example, some conferencing application sessions, may not persist beyond the period there are people in the session. That is, the "room" used to conduct conferencing application session

500 may not exist until someone enters it. However, in some implementations, conferencing application session 500 may exist without anyone currently participating in the session. In the example, conferencing process 10 may assign each session a different phone number that participants (e.g., PSTN participants) may call directly to join the session. For instance, instead of user 50 calling user 46, user 50 may call the room used to conduct conferencing application session 500. In some implementations, this may enable user 50 to be the first person in the session where user 50 may wait for user 46 or others to join.

As will be appreciated by one skilled in the art, the present disclosure may be embodied as a method, system, or computer program product.

Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   receiving, at a computing device, a telephone call from a first user device associated with a first user, the telephone call: (i) being initiated by the first user dialing a telephone number assigned to the computing device, and (ii) corresponding to a request from the first user to participate in a one-to-one telephone conference with a second user, wherein the second user is signed into a web-based user account at the computing device;
   outputting an indication of the telephone call at the computing device;
   receiving an input at the computing device to accept the telephone call via a conferencing application that enables a real-time communication session between the first user, the second user, and one or more third party users; and
   in response to receiving the input to accept the telephone call via the conferencing application, initiating a conferencing application session associated with the web-based user account at the computing device between the first user device and the computing device.

2. The computer-implemented method of claim 1, wherein the conferencing application session includes at least one of real-time video and audio capabilities between the first user device and the computing device.

3. The computer-implemented method of claim 1, wherein the conferencing application session is initiated in a browser at the computing device.

4. The computer-implemented method of claim 1, wherein the web-based user account includes a social network user account.

5. The computer-implemented method of claim 1, wherein the telephone call is forwarded to the computing device from a conferencing process residing on a separate computing device.

6. The computer-implemented method of claim 1, wherein, once initiated, the conferencing application session persists without any participants present.

7. The computer-implemented method of claim 1, wherein the telephone call is received, at least in part, via a public switched telephone network.

8. A computing device including one or more processors and a memory, the computing device being configured to perform operations comprising:
   receiving a telephone call from a first user device associated with a first user, the telephone call: (i) being initiated by the first user dialing a telephone number assigned to the computing device, and (ii) corresponding to a request from the first user to participate in a one-to-one telephone conference with a second user, wherein the second user is signed into a web-based user account at the computing device;
   outputting an indication of the telephone call;
   receiving an input to accept the telephone call via a conferencing application that enables a real-time communication session between the first user, the second user, and one or more third party users; and
   in response to receiving the input to accept the telephone call via the conferencing application, initiating a conferencing application session associated with the web-based user account between the first user device and the computing device.

9. The computing device of claim 8, wherein the conferencing application session includes at least one of real-time video and audio capabilities between the first user device and the computing device.

10. The computing device of claim 8, wherein the conferencing application session is initiated in a browser at the computing device.

11. The computing device of claim 8, wherein the web-based user account includes a social network user account.

12. The computing device of claim 8, wherein the telephone call is forwarded to the computing device from a conferencing process residing on a separate computing device.

13. The computing device of claim 8, wherein, once initiated, the conferencing application session persists without any participants present.

14. The computing device of claim 8, wherein the telephone call is received, at least in part, via a public switched telephone network.

15. A non-transitory computer-readable storage medium having a plurality of instructions stored thereon, which, when executed by a computing device having one or more processors, cause the computing device to perform operations comprising:
   receiving a telephone call from a first user device associated with a first user, the telephone call: (i) being initiated by the first user dialing a telephone number assigned to the computing device, and (ii) corresponding to a request from the first user to participate in a one-to-one telephone conference with a second user, wherein the second user is signed into a web-based user account at the computing device;
   outputting an indication of the telephone call;
   receiving an input to accept the telephone call via a conferencing application that enables a real-time communication session between the first user, the second user, and one or more third party users; and in response to receiving the input to accept the telephone call via the conferencing application, initiating a conferencing application session associated with the web-based user account between the first user device and the computing device.

16. The computer-readable medium of claim 15, wherein the conferencing application session includes at least one of real-time video and audio capabilities between the first user device and the computing device.

17. The computer-readable medium of claim 15, wherein the conferencing application session is initiated in a browser at the computing device.

18. The computer-readable medium of claim 15, wherein the web-based user account includes a social network user account.

19. The computer-readable medium of claim 15, wherein the telephone call is forwarded to the computing device from a conferencing process residing on a separate computing device.

20. The computer-readable medium of claim 15, wherein, once initiated, the conferencing application session persists without any participants present.

* * * * *